Mar. 27, 1923. 1,449,599.
A. GREGORY.
MACHINE FOR USE IN CONNECTION WITH THE MANUFACTURE OF CORKS AND THE LIKE.
FILED JAN. 31, 1921. 3 SHEETS—SHEET 1.
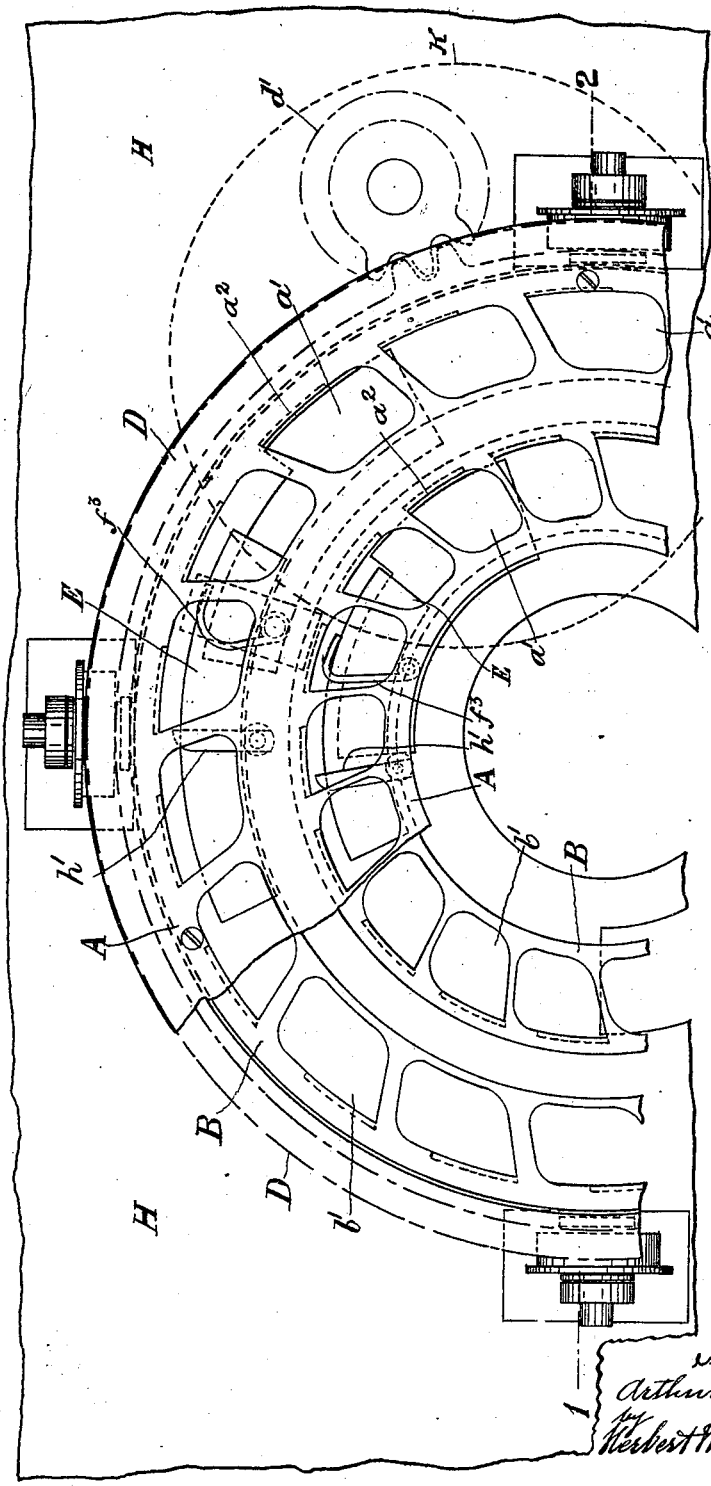

Mar. 27, 1923.
A. GREGORY.
MACHINE FOR USE IN CONNECTION WITH THE MANUFACTURE OF CORKS AND THE LIKE.
FILED JAN. 31, 1921.
1,449,599.
3 SHEETS—SHEET 2.
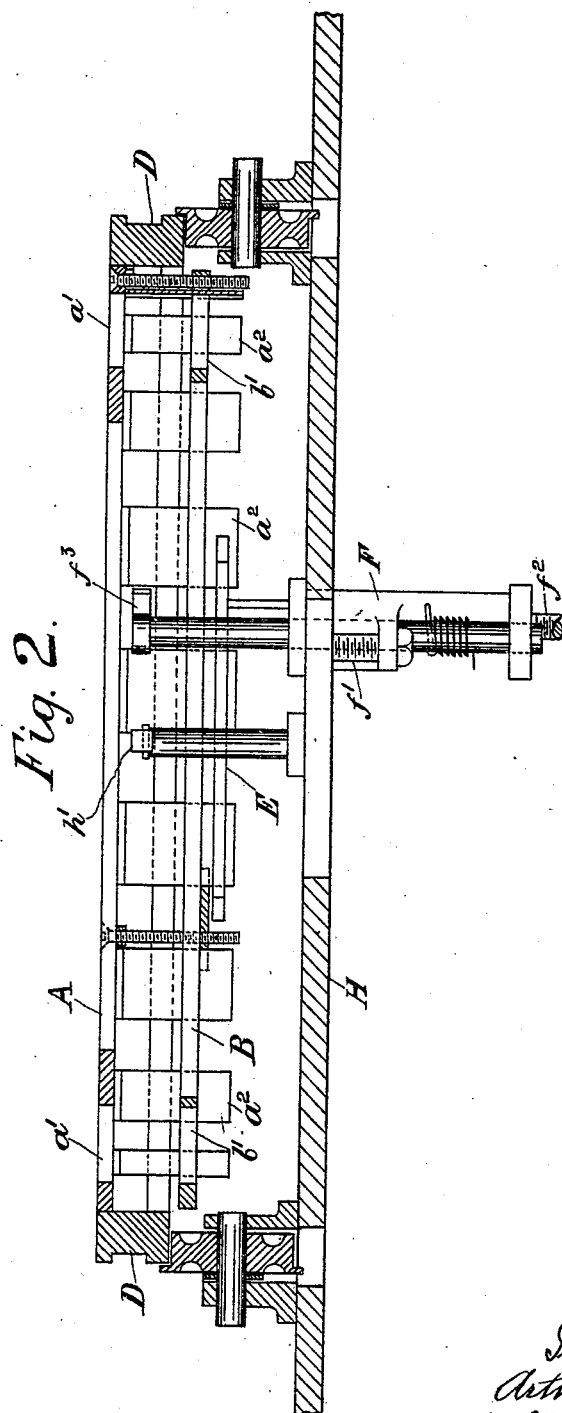

Mar. 27, 1923.　　　　　　　　　　　　　　　　　　　　1,449,599.
A. GREGORY.
MACHINE FOR USE IN CONNECTION WITH THE MANUFACTURE OF CORKS AND THE LIKE.
FILED JAN. 31, 1921.　　　　　　　3 SHEETS—SHEET 3.
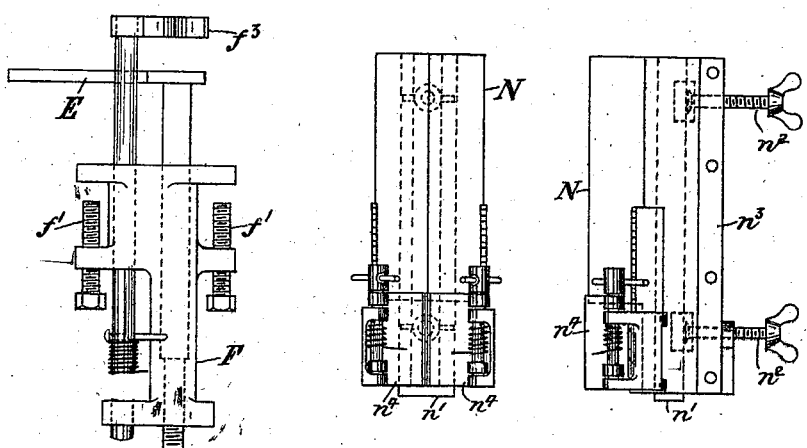
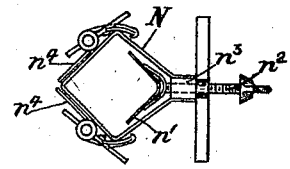

Patented Mar. 27, 1923.

1,449,599

UNITED STATES PATENT OFFICE.

ARTHUR GREGORY, OF HORNSEY, LONDON, ENGLAND.

MACHINE FOR USE IN CONNECTION WITH THE MANUFACTURE OF CORKS AND THE LIKE.

Application filed January 31, 1921. Serial No. 441,222.

*To all whom it may concern:*

Be it known that I, ARTHUR GREGORY, a subject of the King of Great Britain, residing at 40, Lausanne Road, Hornsey, London, N. 8, England, have invented new and useful Improvements in Machines for use in Connection with the Manufacture of Corks and the like, of which the following is a specification.

This invention refers to a new machine for use in connection with the manufacture of corks and the like, that is for cutting or notching cork wood into pieces, cutting or quartering into squares before rounding, and cutting or docking corks into predetermined lengths after being rounded. The machine is also adapted for use in branding or marking corks, caps and the like, or for shaping or gluing, and a number of other operations.

The invention is illustrated in the accompanying drawings.

Fig. 1 is a broken plan view of the work table of the machine.

Fig. 2 is a sectional elevation taken on the line 1—2 of Fig. 1 with the part containing the inner apertures removed.

Fig. 3 is a view of the gauge or regulator.

Fig. 4 is a front view of the chute down which the corks from a hopper are fed to the apertures in the surface plate.

Fig. 5 is a side view of Fig. 4.

Fig. 6 is a plan view of Fig. 5.

The principal part of the machine consists of a table constituting a face or surface plate A and a corresponding adjustable under plate B to which a continuous or intermittent revolving or reciprocating motion is imparted. The lower plate B is made adjustable so that it can be set at different distances from the plate A to suit articles, such as corks, of different length. The machine shown has a revolving motion imparted to it by connecting the part A to the toothed ring D which gears with the wheel $d^1$ driven from any convenient source. This ring D is shown supported on four revolving bearings but may be supported in any other convenient manner.

Formed in the plates A and B are a number of concentrically arranged apertures $a^1$ and $b^1$ respectively, coinciding with one another, to receive and carry forward the material to be dealt with; and fixed to the outer edge of each aperture $a^1$ is a fence $a^2$ extending down from said edge through the corresponding apertures $b^1$, as clearly shown by Fig. 2, for the material to bear against and to maintain it in position while being operated upon. The capacity of the machine depends upon the number of the apertures $a^1$ and $b^1$ and the number of the rows of these apertures, in conjunction with the number or size of the knives or other tools used. On the drawing I have shown two rows of apertures $a^1$ and $b^1$, but it must be understood the machine may be constructed with one row only or more than two rows if desired.

Positioned under the plate B from the point where the material to be treated is fed into the apertures is what I term a gauge or regulator E. This gauge E, upon which the material is supported and slides as it is carried forward, extends from this point to a point beyond that where the material reaches after the operation or operations have been completed; thus permitting said material to drop through said apertures into a suitable receptacle.

The gauge E, which is supported in the holder F fixed to the bed H of the machine by the clamping screws $f^1$, (see Fig. 3) is capable of being adjusted by the screw $f^2$ to permit its being moved nearer to or further from the plate A, as the position of this gauge E regulates the cut or the amount of material projecting above and below the apertures in said plate A. This gauge E can also be adjusted in a parallel direction with the plate A by adjusting the holder F.

The cutting mediums may be circular or other shape, and may have a revolving or reciprocating motion imparted to them. On the machine illustrated one cutting medium K is shown, to which a revolving motion is imparted, but two or more cutting mediums may be used. Or the cutting mediums may be stationary, the table carrying the material to be treated supplying all movement.

When mechanically feeding corks to be docked into the apertures $a^1$ and $b^1$ they are placed in a hopper and pass from thence down one or more tubes of the required size into their respective chutes N of a size suitable to permit the corks to pass down endwise only. Now in order to avoid having to change the chutes, as well as the tubes, to permit corks of various diameters to be fed into the machine I construct the chute with an interior part $n^1$ which is carried by the thumb screws $n^2$, or equivalent, passing through tapped holes in the part $n^3$ forming the backbone of the chute, as shown by Figs. 4, 5 and 6. By this means it will be seen that the part $n^1$ can be adjusted nearer to or further from the front of the chute, thus enabling the interior width of the chute to be varied to suit the particular diameter of corks to be operated upon. Also in order to enable any cork of a greater length than the bulk of the corks placed in the hopper to pass from the mouth or exit of the chute as it is carried forward by the plate A and B, I provide hinged doors or flaps $n^4$ at the exit end, which doors are opened by such cork as it presses against them, and closed after it passes out by the action of springs. These doors $n^4$ also overcome the difficulty which would occur where a short cork having passed down the chute stands below the surface of the plate A, as they permit the succeeding cork which would have entered the aperture in said plate A to pass out of the chute.

The doors $n^4$ are connected to the chute so as to be capable of longitudinal adjustment to enable them to be moved further from or nearer to the surface plate A in case—say for example—it is required to cut a cork two inches long into two corks one inch long.

When the cork has passed from the chute into the apertures $a^1$, $b^1$ as it is carried along the gauge E it first comes in contact with a pivoted spring controlled arm $h^1$ mounted on the bed of the machine, (see Figs. 1 and 2) and as it continues to travel this arm against which it presses and moves on its pivot, holds it against the sides of the apertures and against the fence $a^2$ until it reaches another pivoted spring controlled arm $f^3$, adjustably mounted in the holder F (see Figs. 1, 2 and 3) near the knife, by which it is held in a similar position while being cut, said arm, during the cutting operation, being pushed under the knife by said cork. The arms $h^1$ and $f^3$ as the cork clears them return to their normal positions by the action of the springs, ready for the next or succeeding cork to be operated upon.

What I claim is:

1. In a machine of the class described, a movable work table comprising two superimposed horizontal plates, one of which is adjustable vertically and both of which are provided with apertures for the articles, vertical fence plates secured to one of the said plates and projecting through the apertures of the other plate, means for supporting the articles when in the said apertures, and a stationary spring clip device which presses the articles against the fence plates as the table is moved.

2. In a machine of the class described, a movable work table comprising two superimposed horizontal plates, one of which is adjustable vertically and both of which are provided with apertures for the articles, vertical fence plates secured to one of the said plates and projecting through the apertures of the other plate, and two similar stationary spring grip devices arranged at predetermined distances apart and operating consecutively to position and to clamp the articles against the fence plates as the work table is moved.

3. In a machine of the class described, a movable work table comprising two superimposed horizontal plates provided with similar apertures for the articles, fence plates extending vertically between the said plates at one side of the apertures, means for supporting the articles when in the said apertures, and a stationary spring grip device which presses the articles laterally against the fence plates as the work table is moved.

4. In a machine of the class described, a movable work table comprising two superimposed horizontal plates, the lower plate being provided with means for adjusting it vertically and each plate being provided with similar apertures, the upper plate being also provided with vertical fence plates which project through the apertures of the lower plate, a stationary gage plate for supporting articles when positioned in the apertures of the said plates, a stationary spring grip device which presses the articles against the fence plates in predetermined positions, and means for adjusting the gage plate vertically and supporting it at different distances below the work table.

5. In a machine of the class described, a work table comprising two superposed horizontal plates each provided with similar apertures, a toothed ring secured to the upper plate, a stationary base, bearings for the said ring to revolve on secured to the said base, a toothed driving wheel for revolving the toothed ring, a gage plate secured to the said base and operating to support articles when positioned in the apertures of the said plates, and vertical fence plates extending between the plates of the work table at one side of their apertures, and a spring grip device also secured to the said base and operating to press the articles laterally against the fence plates as the work table is revolved.

6. In a machine of the class described, the combination, with a revoluble work table provided with apertures for receiving the articles, of a supply chute for the articles arranged directly over the said apertures, said chute being rectangular in cross-section and having two of its opposite angles arranged circumferentially of the work table, spring pressed doors hinged to the front sides of the chute at its lower part and normally completing its front angle, said doors being adapted to be opened by contact with the articles when they project too much from the apertures, and a laterally adjustable guide plate angle-shaped in cross-section and arranged in the rear angle of the chute.

In testimony whereof I have signed my name to this specification in the presence of two subscribing witnesses.

ARTHUR GREGORY.

Witnesses:
H. W. DENTON-INGHAM,
G. J. DENTON-INGHAM.